United States Patent [19]

Butti et al.

[11] 3,926,921

[45] Dec. 16, 1975

[54] PHARMACEUTICAL COMPOSITIONS COMPRISING MIXED SALTS OF SULFOGLYCOPEPTIDES WITH METAL AND ORGANIC BASES

[75] Inventors: Adriano Butti, Como; Giuseppe Prinò, Milan, both of Italy

[73] Assignee: Crinos Industria Farmacobiologica SpA, Guardia, Italy

[22] Filed: Mar. 22, 1974

[21] Appl. No.: 453,764

[30] Foreign Application Priority Data

Mar. 27, 1973 Italy................................ 22212/73

[52] U.S. Cl.................. 424/177; 424/260; 424/265
[51] Int. Cl.[2]. A61K 37/00; A01N 9/00; A01N 9/22
[58] Field of Search...... 260/112 R, 112.5; 424/117, 424/260, 265

[56] References Cited
UNITED STATES PATENTS

| | | | |
|---|---|---|---|
| 3,174,899 | 3/1965 | Abramo et al. | 424/177 |
| 3,223,720 | 12/1965 | Casadio | 424/177 |
| 3,441,646 | 4/1969 | Baldwin | 424/177 |
| 3,476,738 | 11/1969 | Argoudelis et al. | 424/177 |
| 3,518,243 | 6/1970 | Butti et al. | 260/112 R |

FOREIGN PATENTS OR APPLICATIONS

| | | |
|---|---|---|
| 2,031,401 | 2/1971 | Germany |
| 3,891 | 3/1966 | France |

OTHER PUBLICATIONS

Pellmont et al.: Chem. Abstr. 74:6396h (1971).
Philips GLF – Chem. Abstr. 70:118110j (1969).
Notarianni et al.: Chem. Abstr. 73:77455s (1970).
Arnold et al.: Chem. Abstr. 73:76844f (1970).
Voroshazy et al.: Chem. Abstr. 75:133021c (1971).
Prino et al.: Chem. Abstr. 75:108340y (1971).

*Primary Examiner*—Lewis Gotts
*Assistant Examiner*—Reginald J. Suyat
*Attorney, Agent, or Firm*—Browdy and Neimark

[57] ABSTRACT

An orally administrable pharmaceutical composition useful in the treatment of gastro-duodenal diseases comprises, as active component, an effective amount of a mixed salt whose anionic moiety is a sulfo-glycopeptide polyanion and whose cationic moiety is an alkali or alkaline-earth metal cation and a nitrogen-containing organic cation derived from a base having spasmolytic and anti-cholinergic activity.

16 Claims, No Drawings

[3,926,921]

PHARMACEUTICAL COMPOSITIONS COMPRISING MIXED SALTS OF SULFOGLYCOPEPTIDES WITH METAL AND ORGANIC BASES

BACKGROUND OF THE INVENTION

1. Field of the invention

The present invention relates to orally administrable pharmaceutical compositions particularly useful in the treatment of gastro-duodenal diseases, which comprise as active components, mixed salts of polysulfuric esters of naturally occurring glycopeptides with metal and organic bases.

2. Description of the prior art

The U.S. Pat. No. 3,518,243 discloses a process for sulfonating glycopeptides of animal origin, thus obtaining sulfoglycopeptides (hereinafter referred to as SGLP). This patent also discloses that the alkali, alkaline-earth, and heavy metal salts of SGLP, are useful as drugs, for instance in the treatment of inflammatory diseases and particularly in the treatment of arthroses and gastric ulcers. These salts, especially the alkaline-earth metal salts, are however somewhat toxic and consequently special precautions are to be taken to reduce their toxity, when these salts are used for therepeutic purposes.

In the copending U.S. patent applications Ser. No. 405,178 and 405,179, filed Oct. 10, 1973, now U.S. Pat. No. 3,872,075, and assigned to the same assignee as this application, there have been disclosed salts of sulfoglycopeptides with metals and aminoacids and pharmaceutical compositions containing them, which salts are endowed with anti-inflammatory, cicatrizing, anti-secretory and anti-peptic properties. These properties make such salts and their compositions particularly useful in the treatment of gastro-duodenal diseases. The salts compositions disclosed in the above identified patent applications are substantially non-toxic and present an anti-inflammatory activity higher than that of the SGLP salts disclosed in the U.S. Pat. No. 3,518,243. The salts and compositions disclosed in the foregoing patent applications are however ineffective on the peripheral nervous system and are consequently poorly active on the symptomatology of the aforementioned diseases, and particularly against the painful spasm which periodically accompany the gastro-duodenal diseases. So, for instance, it is know that the sulfoglycopeptide sodium salt, while active in inhibiting both the experimentally-induced ulcers and the activity of gastroproteases and the acidic secretion of gastic juice, does not alter however the intestinal contractility and is ineffective on the peripheral nervous system (see Prino et al., Eur. J. Pharmacol. 15, 199–126, 1971; Prino et al., Arzneim-Forsch., 21, 918–921, 1971; Prino et al. Eur. J. Pharmacol., 17 279–282, 1972; Prino et al., Am. J. Dig. Dis., 17, 863–867, 1972).

SUMMARY OF THE INVENTION

It has now been found that pharmaceutical compositions comprising, as active component, an effective amount of a water-soluble salt, wherein the anionic moiety is a sulfoglycopeptide polyanion and the cationic moiety is formed by:

a. a metal cation selected from the group consisting of the alkali and alkaline-earth metal cations; and b. a nitrogen-containing organic cation derived from an organic base having spasmolytic and anti-cholinergic activities, are extremely effective against gastro-duodenal diseases, while not substantially presenting any toxic activity.

The active components of the pharmaceutical compositons in accordance with this invention and a process for their preparation have been disclosed in our copending application Ser. No. 453,765 filed on Mar. 22, 1974, now U.S. Pat. No. 3,900,458.

These salts have been found to synergistically combine the anti-secretory, anti-peptic and protective action shown by sulfoglycopeptides, with the spasmolytic and anti-secretory activity shown by the bases to such an extent that the amount of both SGLP and base components present in the mixed salt is far lower than the amount of the same components when used separately, with a view to obtaining the same therapeutic result. Remarkable importance is to be attached to such synergistic effect, if it is taken into account that drugs of this type are often used in long-term treatments and that anti-cholinergic agents show at the doses currently used noticeable, generally undesired side-effects.

It has further been found that the mixed salts in accordance with this invention are far less toxic than the corresponding amount of the base contained in the same salt. Consequently it was not possible to obtain an evaluation for $LD_{50}$, since at the maximum dose which was orally administrable to rats, a mortality ranging from 10 to 16% only depending on the specific salt was obtained.

DESCRIPTION OF THE PREFERRED EMBODIMENTS

As aforementioned, in the course of experimental tests relating to anti-secretory and anti-ulcer activity, a higher synergistic activity of the compositions of this invention in comparison with the compositions comprising the SGLP and base, as separate components, has been shown. Particularly, the compositions comprising those mixed salts which contain from about 5 to about 20% by weight of base component were shown to effectively inhibit experimentally-induced ulcers and secretion of acidic gastric juice to a larger extent then the sum of the activities shown by the base and sulfoglycopeptide when separately administered.

In the course of other tests it was shown that the specific activities of the salt components, such as the anti-peptic activity of the sulfoglycopeptide and the anti-cholinergic and spasmolytic activity of the bases, were not modified.

Preferred, although non-limiting examples of the aforementioned organic bases are: atropine, hyoscine, anisotropine and papaverine. Among the metal cations, sodium is particularly preferred.

As mentioned above, the compositions of this invention have been found to be extremely effective in the treatment of gastro-duodenal diseases. In fact, in tests performed on laboratory animals, the compositions of this invention have proved to be active in the following:

a. inhibition of u.cer caused by pylorus ligature and restraint at a dose of 20–200 mg/kg;

b. acidity inhibition of acid gastric secretion induced by ligature, at a dose of about 50 mg/kg;

c. inhibition of acid gastric secretion induced by pentagastrine (80 µg/kg administered intravenously) at a dose of about 100mg/kg;

d. inhibition of gastrointestinal motility induced by methacoline (2mg/kg administered subcutaneously) at a dose of about 50mg./kg.

The following pharmacological tests further illustrate the therapeutic properties of the compositions in accordance with this invention.

PHARMACOLOGICAL TESTS

In order to show the pharmacological activity of the SGLP mixed salt in accordance with this invention there are hereby disclosed, as non-limiting examples, some results obtained with the anisotropine-sodium salt of sulfoglycopeptide (SGLP/Na/anisotropine), which has been tested on rats in a number of pharmacological tests, in comparison with the results shown by anisotropine methylbromide (8-methyltropinium-bromide 3-(2'-propyl)pentanoate) and the sodium salt of the sulfoglycopeptide (SGLP/Na).

It has been found that the anisotropine-containing salt of sulfoglycopeptide is very slightly toxic to rat after oral administration; when expressed as anisotropine content, a remarkable decrease in this drug toxity is observed (Table I).

A number of pharmacological tests have shown an enhancement of the mixed salt activity over the single salt components this phenomenon is particularly apparent in the treatment of ulcer caused by pylorus ligature (Table II), restraint ulcer (Table III), and the acidic secretion of gastric juice (Table IV and V).

A number of different tests have shown that some SGLP and anisotropine pharmacological activities are maintained in the mixed salt: for instance, the anisotropine activity on intestinal hypermotility induced by a cholinergic stimulus (Table VI), or on the acetylcholine-induced spasm in guinea pig's isolated ileus are quantitatively maintained in the mixed salts; also the anti-peptic activity of SGLP is not altered by the anisotropine presence in the mixed salt (Table VII).

TABLE I

Acute toxity after oral administration to rats (which have been kept under observation for 10 days) of SGLP sodium salt, anisotropine methyl-bromide and anisotropine-sodium mixed salt of sulfoglycopeptide (containing 15.6% of anisotropine base).

| Substance | $LD_{50}$ and confidence limits |
|---|---|
| SGLP/Na | non-toxic at 4g/kg |
| Anisotropine methyl-bromide | 794 (684-921) mg/kg |
| SGLP/Na/Anisotropine | non-toxic at 4g/kg |

TABLE II

Inhibition of ulcer caused by pylorus ligature after oral administration to rats of SGLP sodium salt, N-methyl octatropinium bromide and anisotropine-sodium mixed salt of sulfoglycopeptide (containing 15.6% of anisotropine base)

| No. of rats | Treatment | oral dose | Ulcer score mean ± SE | Inhibition | P |
|---|---|---|---|---|---|
| 30 | Saline | 10 ml/kg | 3.17 ± 0.39 | — | — |
| 30 | SGLP/Na | 25 mg/kg | 2.40 ± 0.39 | 24.3 | NS |
| 30 | Anisotropine methylbromide | 5 mg/kg | 2.05 ± 0.38 | 35.3 | 0.05 |
| 30 | SGLP/Na/Anisotropine | 30 mg/kg | 1.25 ± 0.28 | 60.6 | 0.001 |

NOTE. by score is meant the average value of arbitrary scores given to observed ulcers.
SE = Standard error
P = Probability
NS = Not statistically significant

TABLE III

Inhibition of restraint-induced ulcer in rats after oral administration of SGLP sodium salt, anisotropine methylbromide and anisotropine-sodium mixed salt of sulfoglycoppetide (containing 7.8% of anisotropine base).

| No. of rats | Treatment | oral dose | Ulcer score mean ± SE | Inhibition | P |
|---|---|---|---|---|---|
| 30 | Saline | 10 mg/kg | 3.30 ± 0.28 | — | — |
| 30 | SGLP/Na | 180mg/kg | 2.96 ± 0.35 | 10.4 | NS |
| 30 | Anisotropine methylbromide | 20 mg/kg | 1.96 ± 0.30 | 40.6 | <0.005 |
| 30 | SGLP/Na/Anisotropine | 200mg/kg | 1.26 ± 0.28 | 61.8 | <0.001 |

TABLE IV

Effect on basal gastric secretion of rats which have been orally administered with SGLP sodium salt, anisotropine methylbromide and anisotropine-sodium mixed salt of sulfoglycopeptide (containing 15.6% of anisotropine base).

A. Acidity inhibition of ligature-induced gastric secretion

| No. of rats | Treatment | oral dose | $H^+mEq/1h$ | Inhibit. % | P |
|---|---|---|---|---|---|
| 24 | Saline | 2 ml/Kg | 1.31 ± 0.16 | — | — |
| 24 | SGLP/Na | 40 mg/kg | 1.21 ± 0.16 | 7.6 | NS |
| 24 | Anisotropine methylbromide | 10 mg/kg | 0.85 ± 0.2 | 35.1 | NS |
| 24 | SGLP/Na/Anisotropine | 50 mg/kg | 0.33 ± 0.04 | 74.8 | <0.001 |

B. Inhibition of the amount of gastric secretion after ligature

| No. of rats | Treatment | Oral dose | Volume ml/1h | Inhib. % | P |
|---|---|---|---|---|---|
| 24 | Saline | 2 ml/kg | 1.59 ± 0.1 | — | — |
| 24 | SGLP/Na | 40 mg/kg | 1.65 ± 0.1 | +3.8 | NS |
| 24 | Anisotropine methylbromide | 10 mg/kg | 1.28 ± 0.2 | 19.5 | NS |
| 24 | SGLP/Na/Anisotropine | 50 mg/kg | 0.89 ± 0.07 | 44.02 | <0.001 |

TABLE V

Inhibition of acid gastric secretion induced by pentagastrine (80 ug/kg I.V.) in rats which have been orally administered with SGLP sodium salt, anisotropine methylbromide and anisotropine-sodium mixed salt of sulfoglycopeptide (containing 7.8% of anisotropine base).

| No. of rats | Treatment | Oral dose | H⁻mEq/1h mean ± SE | Inhib. % | P |
|---|---|---|---|---|---|
| 20 | Saline (no pentagastrine) | 2 ml/kg | 0.72 ± 0.10 | — | — |
| 20 | Saline solution | 2 ml/kg | 1.64 ± 0.22 | — | — |
| 20 | SGLP/Na | 90 mg/kg | 0.80 ± 0.14 | 51.2 | <0.01 |
| 20 | Anisotropine methylbromide | 10 mg/kg | 1.34 ± 0.16 | 18.5 | NS |
| 20 | SGLP/Na Anisotropine | 100mg/kg | 0.37 ± 0.07 | 77.4 | <0.001 |

TABLE VI

Activity of SGLP sodium salt, anisotropine methylbromide and anisotropine-sodium mixed salt of sulfoglycopeptide (containing 15.6% of anisotropine base) on methacoline-induced gastrointestinal motility of rats (2mg/kg s.c.)

| No. of rats | Treatment | Oral dose | Run of coal suspension (cm.) mean ± SE | Inhib. % | P |
|---|---|---|---|---|---|
| 20 | Saline (no methacoline) | 5 ml/kg | 54.97 ± 1.2 | — | — |
| 20 | Saline solution | 5 ml/kg | 87.41 ± 1.9 | — | — |
| 20 | SGLP/Na | 40 mg/kg | 83.48 ± 2.4 | 4.5 | NS |
| 20 | Anisotropine methylbromide | 10 mg/kg | 52.1 ± 2.7 | 40.4 | <0.001 |
| 20 | SGLP/Na Anisotropine | 50 mg/kg | 51.3 ± 2.4 | 41.3 | <0.001 |

TABLE VII

Anti-peptic activity of, SGLP sodium salt, anisotropine methylbromide and anisotropine-sodium mixed salt of sulfoglycopeptide (containing 7.8% of anisotropine base). Pylorus ligature was maintained for 5 hours and the treatment was started immediately after ligature.

| No. of rats | Treatment | Oral dose | Peptic activity (μ moles of tyrosine) | Inhib. % | P |
|---|---|---|---|---|---|
| 20 | Saline | 2 ml/kg | 62.5 ± 5.4 | — | — |
| 20 | SGLP/Na | 80 mg/kg | 37.7 ± 5.6 | 39.7 | <0.01 |
| 20 | Anisotropine methylbromide | 8.8mg/kg | 52.3 ± 7.2 | 16.3 | NS |
| 20 | SGLP/Na Anisotropine | 88.8mg/kg | 32.3 ± 4.6 | 48.3 | <0.001 |

In order to be orally administered to human beings, the composition of this invention can be incorporated in any one of the several pharmaceutically acceptable carriers or coatings which are well known to those skilled in the art.

For instance, capsules having the following compostion can be prepared:

| | | |
|---|---|---|
| SGLP/Na/Anisotropine | mg | 50.0 |
| Lactose | " | 126.4 |
| Aerosil (1) | " | 2.4 |
| Magnesium stearate | " | 1.2 |

(1) trade name of an impalpable silica.

An illustrative composition for tablets is as follows:

| | | |
|---|---|---|
| SGLP/Na/Anisotropine | mg | 50.0 |
| Avicell (2) | " | 256.0 |
| Talc | " | 8.3 |
| Aerosil (1) | " | 0.7 |

(2) Trade name of a microgranular cellulose.

Modifications and/or changes may be made by those skilled in the art to the process and mixed salts according to this invention, without departing from the scope and spirit thereof.

What we claim is:

1. An orally administrable pharmaceutical composition, comprising:
   an amount effective for the treatment of gastroduodenal diseases of a mixed salt, wherein the anionic moiety is a sulfoglycopeptide polyanion and the cationic moiety is:
   a. a metal cation selected from the group consisting of the alkali and alkaline-earth metal cations, and
   b. the cation of a nitrogen-containing organic base having spasmolytic and anticholinergic activities; and
   a pharmaceutically acceptable carrier or coating.

2. The composition of claim 1, wherein the content of said nitrogen-containing organic cation in said mixed salt is 5 to 20% by weight.

3. The composition of claim 2, wherein said metal cation is sodium.

4. The composition of claim 2, wherein said base is atropine.

5. The composition of claim 2, wherein said base is hyoscine.

6. The composition of claim 2, wherein said base is anisotropine.

7. The composition of claim 2, wherein said base is papaverine.

8. The composition of claim 1 in unit dosage form.

9. A composition in accordance with claim 1, wherein said base is selected from the group consisting of atropine, hyoscine, anisotropine and papaverine.

10. A composition in accordance with claim 1, wherein said mixed salt is present in an anti-inflammatory, cicatrizing, anti-secretory or anti-peptic non-toxic amount.

11. A method for treating gastro-duodenal diseases comprising administering an amount effective for the treatment of gastro-duodenal diseases of a mixed salt having, as the anionic moiety thereof, a sulfoglycopeptide polyanion, and, as the cationic moiety thereof:
   a. a metal cation selected from the group consisting of the alkali and alkaline-earth metal cations, and
   b. the cation of a nitrogen-containing organic base having spasmolytic and anticholinergic activities.

12. A method in accordance with claim 11, wherein the mixed salt is in the presence of a pharmaceutically acceptable carrier or coating.

13. A method in accordance with claim 11, wherein the content of said nitrogen-containing organic cation in said mixed salt is about 5 to about 20% by weight.

14. A method in accordance with claim 13, wherein said base is selected from the group consisting of atropine, hysocine, anisotropine and papaverine.

15. A method in accordance with claim 11, wherein said mixed salt is administered in an anti-inflammatory, cicatrizing, anti-secretory or anti-peptic non-toxic amount.

16. A method in accordance with claim 14, wherein said metal cation is sodium.

* * * * *